(12) United States Patent
Oroskar et al.

(10) Patent No.: US 8,983,505 B1
(45) Date of Patent: Mar. 17, 2015

(54) PROVIDING A MESSAGE NOTIFICATION IN A WIRELESS COMMUNICATION SYSTEM

(71) Applicant: Sprint Spectrum LP, Overland Park, KS (US)

(72) Inventors: Siddharth S. Oroskar, Overland Park, KS (US); John Prock, Peculiar, MO (US); Naresh Madineni, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 231 days.

(21) Appl. No.: 13/748,877

(22) Filed: Jan. 24, 2013

(51) Int. Cl.
*H04W 68/00* (2009.01)
*H04M 3/537* (2006.01)
*H04W 68/02* (2009.01)
*H04W 76/02* (2009.01)

(52) U.S. Cl.
CPC .............. *H04M 3/537* (2013.01); *H04W 68/02* (2013.01); *H04W 76/02* (2013.01); *H04W 68/025* (2013.01); *H04W 68/005* (2013.01)
USPC ..................... 455/458; 455/412.1; 455/412.2; 455/515; 455/567

(58) Field of Classification Search
CPC ... H04W 68/00; H04W 68/02; H04W 68/025; H04W 68/005; H04W 76/02
USPC ..................... 455/412.1, 412.2, 458, 515, 567
See application file for complete search history.

(56) References Cited

U.S. PATENT DOCUMENTS

| | | | |
|---|---|---|---|
| 7,200,412 B2 * | 4/2007 | Kim .............................. | 455/458 |
| 7,783,315 B2 * | 8/2010 | Iyer et al. ..................... | 455/519 |
| 8,032,159 B2 * | 10/2011 | Wu et al. ....................... | 455/458 |
| 8,199,889 B2 | 6/2012 | Raphael et al. | |
| 2010/0022256 A1 * | 1/2010 | Hochedez .................... | 455/458 |
| 2011/0143723 A1 | 6/2011 | Shaw et al. | |
| 2012/0009953 A1 * | 1/2012 | Wu et al. ...................... | 455/458 |

* cited by examiner

Primary Examiner — Olumide T Ajibad Akonai

(57) ABSTRACT

In systems and methods of providing a message notification in a wireless communication system, at least one paging message is sent to a wireless device, and it is determined whether a response is received from the wireless device to any paging message. A timer is initiated comprising a timer value based on a number of the paging messages sent to the wireless device, and whether a response is received from the wireless device to any of the paging messages. When the timer expires, a message notification is sent to the wireless device indicating that the message is available for the wireless device.

17 Claims, 6 Drawing Sheets

PROVIDING A MESSAGE NOTIFICATION IN A WIRELESS COMMUNICATION SYSTEM

TECHNICAL BACKGROUND

Communication networks can facilitate point-to-point telephony between network endpoints. However, even in an age of widely available communication capability, including wireless communication networks, a phone call may not be answered. For example, the target device may be disconnected from a communication network, either because the device is out of range of the communication network, or because the device is turned off, and thus the target device does not signal the incoming call to a user. In addition, a user may choose not to answer an incoming call. In such cases, many communication networks provide the initiator of the call an opportunity to leave a recorded voice message for the user of the target device. Typically, a recorded voice message left by a caller is received at a processing node in the communication network (one example of which is a messaging node, such as a voice mail server). Based on the received voice message, a message notification can be sent to the target device that a message has been received for the target device.

Overview

At least one paging message is sent to a wireless device, and it is determined whether a response is received from the wireless device to any paging message. A timer is initiated comprising a timer value based on a number of the paging messages sent to the wireless device, and whether a response is received from the wireless device to any of the paging messages. When the timer expires, a message notification is sent to the wireless device indicating that the message is available for the wireless device.

DETAILED DESCRIPTION

Figure 1:
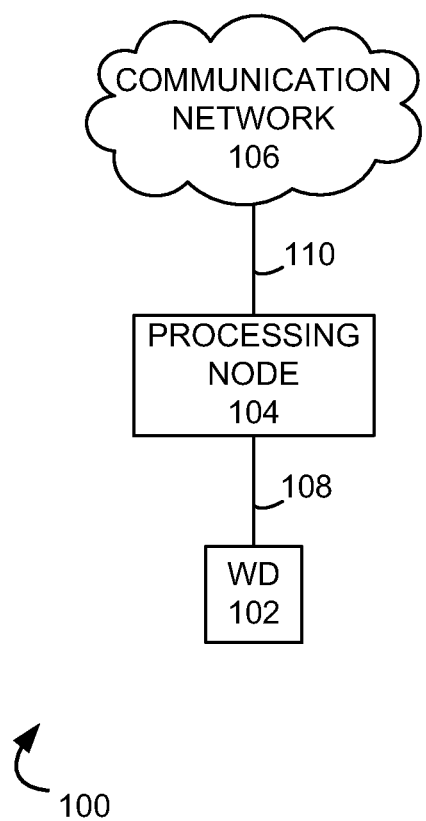
FIG. 1 illustrates an exemplary communication system to provide a message notification in a wireless communication system.

FIG. 1 illustrates an exemplary communication system 100 to provide a message notification comprising wireless device 102, processing node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with processing node 104 over communication link 108.

Processing node 104 is a network element capable of providing a notification message, for example, intended for wireless device 102. Processing node 104 can comprise, for example, a dedicated network node, or the functionality of location processing node 104 can be included in another network node such as a mobility management entity (MME), a call session control function (CSCF), a gateway, a proxy node, a home location register (HLR), a home subscriber server (HSS), or other network node capable of supporting the appropriate functionality. Processing node 104 can comprise a processor and associated circuitry to execute or direct the execution of computer-readable instructions. Processing node 104 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 104 can receive instructions and other input at a user interface. Processing node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise base stations, wireless communication nodes, telephony switches, internet routers, network gateways, computer systems, communication links, or some other type of communication equipment, and combinations thereof.

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between processing node 104 and communication network 106 which are omitted for clarity, including additional processing nodes, routers, gateways, and physical and/or wireless data links for carrying data among the various network elements.

In operation, at least one paging message is sent to wireless device 102. The sending of the paging messages can be directed by processing node 104. Processing node 104 can determine whether a response is received from wireless device 102 to any paging message. A timer is initiated comprising a timer value based on a number of the paging messages sent to wireless device 104 and whether a response is received from wireless device 104 to any of the paging messages. When the timer expires, a message notification is sent to wireless device 102 indicating that the message is available for the wireless device.

Figure 2:
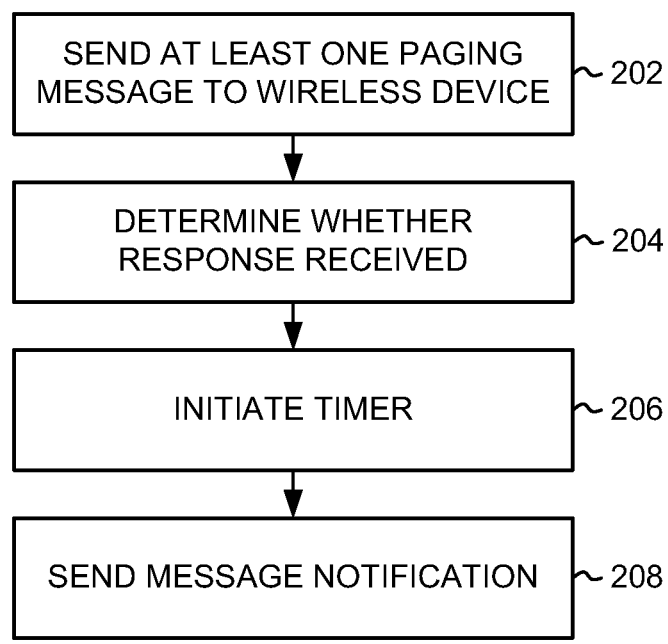
FIG. 2 illustrates an exemplary method of providing a message notification in a wireless communication system.

FIG. 2 illustrates an exemplary method of providing a message notification in a wireless communication system. In operation 202, at least one paging message is sent to a wireless device, and in operation 204 it is determined whether a response is received from the wireless device to any of the paging messages. Paging comprises a wireless network process to provide a notification to wireless devices. The notification can be related to incoming data or an incoming communication session request. A paging message can be sent to wireless device 102 over communication link 108. In an embodiment, the paging message can be sent using a Paging Channel (PCH), a Physical Downlink Control Channel (PDCCH), a Physical Downlink Shared Channel (PDSCH), or some other portion of communication link 108. The sending of the paging message can be directed by processing node 104.

In an embodiment, at least one paging message can be sent to wireless device 102 to notify wireless device 102 about an incoming communication session, and it can be determined whether wireless device 102 responds to any of the paging messages. For example, wireless device 102 may be disconnected from a communication system 100, either because the wireless device 102 is has moved out of range of communication system 100, or because the wireless device 102 is turned off. In addition, a user of wireless device 102 may choose not to answer an incoming call, or a user of wireless device 102 may provide an input to wireless device 102 to refuse an incoming call.

In operation 206, a timer is initiated comprising a timer value based on a number paging messages sent to the wireless device, and whether a response is received from the wireless device to any of the at least one paging message. For example, three paging messages may be sent to wireless device 102, and no response may be received by processing node 104. This can occur, for example, when wireless device 102 is out of range of the communication system (for example, out of a coverage area of access node 104), or when wireless communication link conditions are insufficient for wireless device 102 to receive a paging message, or when signals to wireless device 102 are blocked by an environmental impediment, or when wireless device 102 is powered off. As another example, one paging message can be sent to wireless device 102, and wireless device 102 can respond to the single paging message. For example, wireless device 102 can receive the paging message, and can send an indication rejecting an incoming communication session, for example, in response to a user inputting a refusal to answer an incoming call to wireless device 102. As another example, two paging messages can be sent to wireless device 102, and wireless device 102 can respond to the second paging message. This may occur, for example, where wireless communication conditions are poor, or where wireless device 102 is highly mobile and moving through areas of varying communication conditions, for example, such that wireless device 102 did not receive the first paging message, but did receive the second paging message. Other examples of paging messages being sent, received and responded to are also possible. In operation 206, a timer can be initiating comprising a timer value based on a number of the at least one paging message sent to the wireless device, and whether a response is received from the wireless device to any of the at least one paging message.

In operation 208, a message notification indicating that a message is available for the wireless device is sent to the wireless device when the timer expires. In an embodiment, when a paging message is sent to wireless device 102, and wireless device 102 does not respond, typically a communication system provides an initiator of the call an opportunity to leave a message, such as a recorded voice message, for the user of wireless device 102. The message notification can notify wireless device 102 that a recorded message or other message is available for wireless device 102. In an embodiment, the message notification can also indicate that an email, a text message, a recording attached to a message, or some other message is available for wireless device 102.

Figure 3:
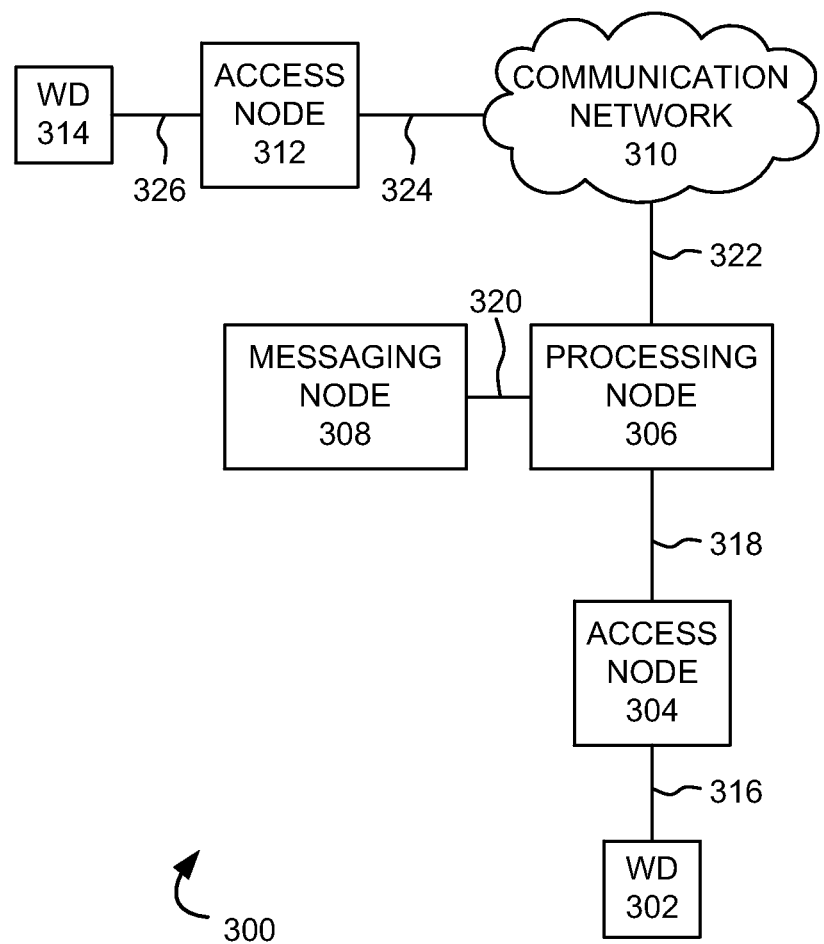
FIG. 3 illustrates another exemplary communication system to provide a message notification in a wireless communication system.

FIG. 3 illustrates another exemplary communication system 300 to provide a message notification in a wireless communication system comprising wireless devices 302 and 314, access nodes 304 and 312, processing node 306, messaging node 308, and communication network 310. Examples of wireless devices 302 and 314 can comprise a cell phone, a smart phone, a computing platform such as a laptop, palmtop, or tablet, a personal digital assistant, or an internet access device, including combinations thereof. Wireless device 302 is in communication with access node 304 over communication link 316, and wireless device 314 is in communication with access node 312 over communication link 326.

Access nodes 304 and 314 are each a network node capable of providing wireless communications to wireless devices 302 and 314, respectively, and can be, for example, a base transceiver station, a radio base station, an eNodeB device, or an enhanced eNodeB device. Access node 304 is in communication with processing node 306 over communication link 318, and access node 312 is in communication with communication network 310 over communication link 324.

Processing node 306 is a network element capable of providing a notification message, for example, intended for wireless device 302. Processing node 306 can comprise, for example, a dedicated network node, or the functionality of processing node 306 can be included in another network node such as a mobility management entity (MME), a call session control function (CSCF), a gateway, a proxy node, a home location register (HLR), a home subscriber server (HSS), or other network node capable of supporting the appropriate functionality. Processing node 306 can comprise a processor and associated circuitry to execute or direct the execution of computer-readable instructions. Processing node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 306 can receive instructions and other input at a user interface. Processing node 306 is in communication with communication network 310 over communication link 322, and with messaging node 308 over communication link 320.

Messaging node 308 is a network element capable of receiving a message for a wireless device. Examples of a message for a wireless device can include a recorded voice message, an email, a text message, a recording attached to a message, or some other message, for example, intended for a wireless device such as wireless devices 302. Messaging node 308 can comprise a processor and associated circuitry, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Messaging node 308 can receive instructions and other input at a user interface. The functionality of messaging node 308 can be included in another network element, such as processing node 306 or some other network node. The functionality of messaging node 308 can also be distributed across two or more network elements.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also base stations, wireless communication nodes, telephony switches, internet routers, network gateways, computer systems, communication links, or some other type of communication equipment, and combinations thereof.

Communication links 316, 318, 320, 322, 324 and 326 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between processing node 104 and communication network 106 which are omitted for clarity, including additional processing nodes, routers, gateways, and physical and/or wireless data links for carrying data among the various network elements.

In operation, activity from wireless device 314 can cause a message to be received for wireless device 302. For example, wireless device 314 may attempt to initiate a communication session with wireless device 302, but wireless device 302 either does not respond or refuses the communication session, following which wireless device 314 may record a voice message or originate another message for wireless device 302. Similarly, wireless device 314 may send an email, a text message, a recording attached to a message, or some other message for wireless device 302.

Figure 4:
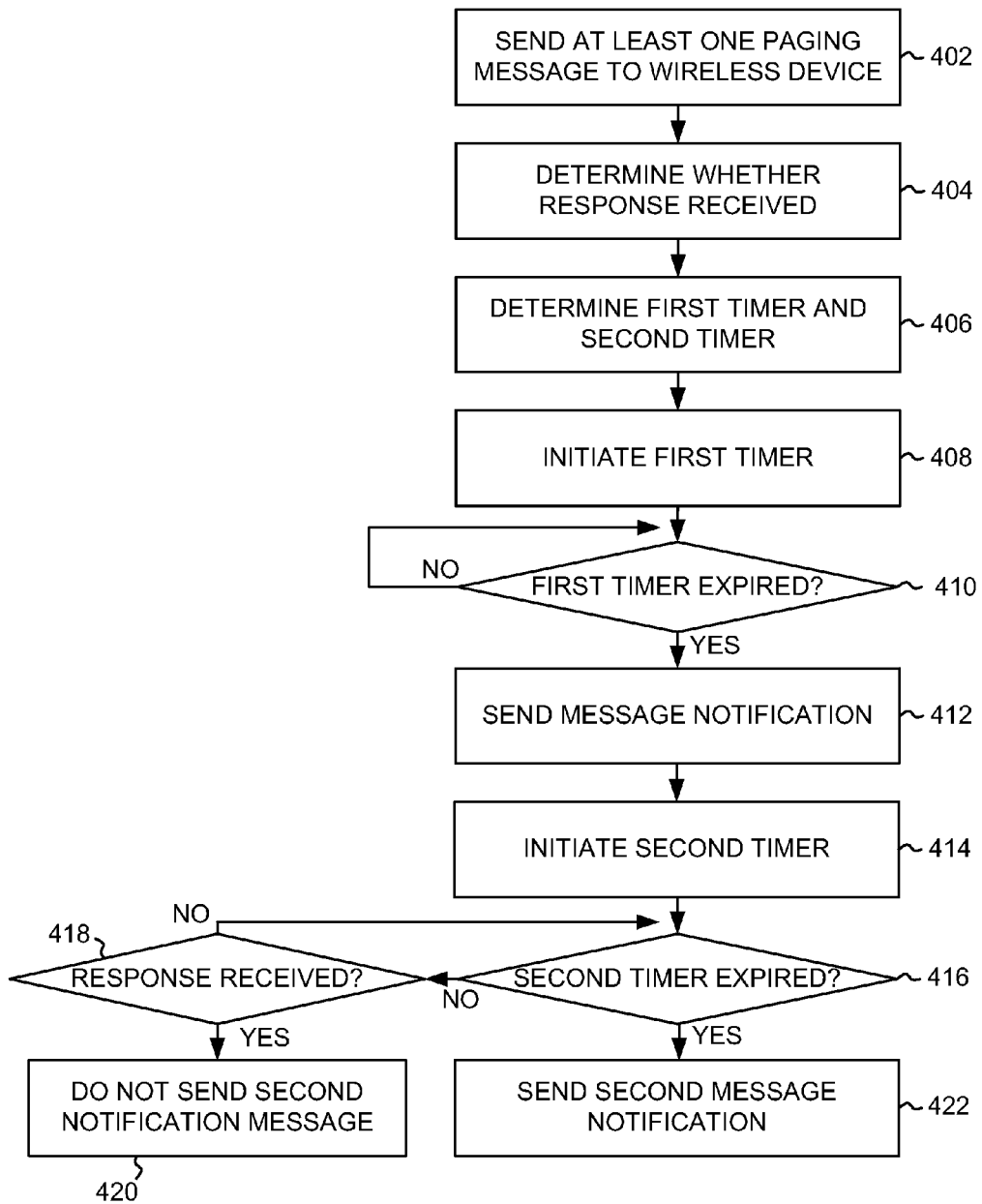
FIG. 4 illustrates another exemplary method of providing a message notification in a wireless communication system.

FIG. 4 illustrates another exemplary method of providing a message notification in a wireless communication system. In operation 402, at least one paging message is sent to a wireless device, and in operation 404 it is determined whether a response is received from the wireless device to any of the paging messages. The paging message can be related to an incoming data connection or an incoming communication session request. A paging message can be sent to wireless device 302 over communication link 316 via access node 304. In an embodiment, the paging message can be sent using a Paging Channel (PCH), a Physical Downlink Control Channel (PDCCH), a Physical Downlink Shared Channel (PDSCH), or some other portion of communication link 316. The sending of the paging message can be directed by processing node 306, by messaging node 308, or by another network element of communication system 300.

In an embodiment, at least one paging message can be sent to wireless device 302 to notify wireless device 302 about an incoming communication session, and it can be determined whether wireless device 302 responds to any of the paging messages. For example, wireless device 302 may be disconnected from a communication system 300, either because the wireless device 302 is has moved out of range of communication system 300, communication link conditions are poor, or because the wireless device 302 is turned off. In addition, a user of wireless device 302 may choose not to answer an incoming call, or a user of wireless device 302 may provide an input to wireless device 302 to refuse an incoming call. In an embodiment, a response can be received from wireless device 302 further comprising a signal strength indicator of a signal strength of communication link 316.

In operation 406, a first timer and a second timer are determined. The first timer and the second timer can each comprise a timer value based on a number of paging messages sent to the wireless device, and whether a response is received from the wireless device to any of the at least one paging message. For example, three paging messages may be sent to wireless device 302, and no response may be received by processing node 306. This can occur, for example, when wireless device 302 is out of range of the communication system, or when wireless communication link conditions are insufficient for wireless device 302 to receive a paging message, or signals to wireless device 302 are blocked by an environmental impediment, or when wireless device 302 is powered off. In such case, the first timer can be given a first setting, for example ten minutes, and the second timer can be given a second setting, for example twenty minutes. (The timer settings described herein are exemplary and are not intended as limitations.)

As another example, one paging message can be sent to wireless device 302, and wireless device 302 can respond to the single paging message. For example, wireless device 302 can receive the paging message, and can send an indication rejecting an incoming communication session, for example, in response to a user inputting to wireless device 302 a refusal to answer an incoming call. In such case, the first timer can be given a first setting, for example zero minutes, and the second timer can be given a second setting, for example ten seconds.

As another example, two paging messages can be sent to wireless device 302, and wireless device 302 can respond to the second paging message. This may occur, for example, where wireless communication conditions are poor, or where wireless device 302 is highly mobile and moving through areas of varying wireless communication link quality, for example, such that wireless device 302 did not receive the first paging message, but did receive the second paging message. In such case, the first timer can be given a first setting, for example five minutes, and the second timer can be given a second setting, for example five minutes seconds. Other examples of paging messages being sent, received and responded to, and other examples of timer settings, are also possible.

In an embodiment, a signal strength indicator received with a response from wireless device 302 can also be used to determine the first and second timers. For example, two paging messages can be sent to wireless device 302. Wireless device 302 can respond to the second paging message, and the response from wireless device 302 can include a signal strength indicator of a signal strength of communication link 316. Examples of a signal strength indicator include a reference signal received power (RSRP), reference signal received quality (RSRQ), received signal strength indicator (RSSI), a signal to interference plus noise ratio (SINR), a carrier to interference plus noise ratio (CINR), and the like. The first timer and the second timer can each comprise a timer value based on a number of paging messages sent to the wireless device, whether a response is received from the wireless device to any of the at least one paging message, and the signal strength indicator received from wireless device 302.

In operation 408, the first timer is initiated, and in operation 410 is it determined whether the first timer has expired. When it is determined that the first timer has expired (operation 410-YES), a message notification is sent to wireless device 302 indicating that a message is available for the wireless device (operation 412). The message notification can notify wireless device 302 that a recorded voice mail, an email, a text message, a recording attached to a message, or some other message is available for wireless device 302.

In operation 414, the second timer is initiated, and in operation 416 is it determined whether the second timer has expired. When a response is received to the message notification (operation 418-YES), then a second notification message is not sent (operation 420). For example, when wireless device 302 retrieves the available message, for example, by listening to the recorded voice message, or by requesting delivery of a waiting message, then a second notification message is not sent. In an embodiment, wireless device 302 can send a message via access node 304 to messaging node 308 to, for example, listen to a recorded voice message, or to request an email, a text message, a recording attached to a message, or some other message.

When it is determined that the second timer has expired (operation 416-YES), a second message notification is sent to wireless device 302 indicating that the message is available for the wireless device (operation 422). Similar to the previous message notification, the second message notification can notify wireless device 302 that a recorded voice mail, an email, a text message, a recording attached to a message, or some other message is available for wireless device 302.

Figure 5:
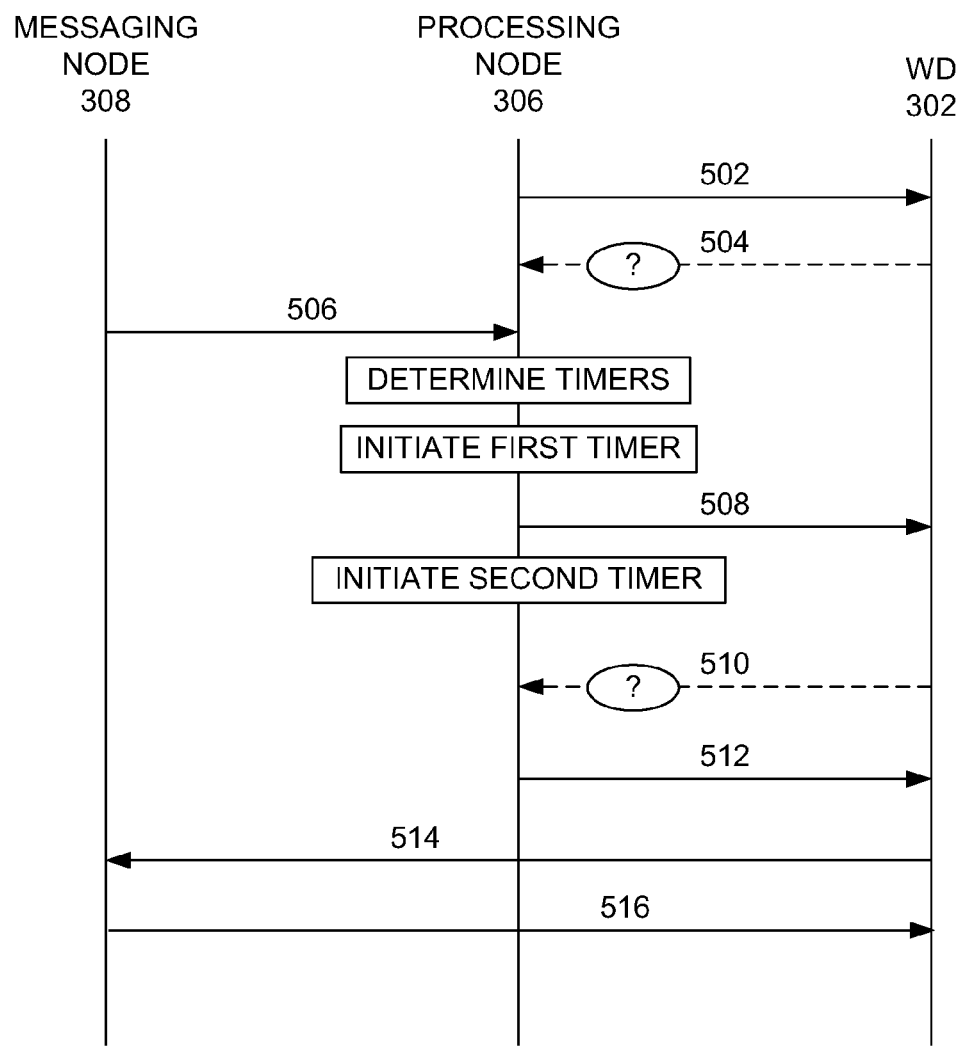
FIG. 5 illustrates a message flow diagram of an exemplary method of providing a message notification in a wireless communication system.

FIG. 5 illustrates a message flow diagram of an exemplary method of providing a message notification in a wireless communication system. Processing node 306 directs the sending of one or more paging messages 502 to wireless device 302. Processing node 306 determines whether a response 504 is received from wireless device 302 to any of the one or more paging messages 502.

Processing node 306 receives a message notifier 506 indicating that a message is available for wireless device 302. Processing node 306 can determine a first timer and a second timer, each timer comprising a timer value based on a number of the at least one paging message sent to the wireless device, and whether a response is received from the wireless device to any of the at least one paging message. In an embodiment, each timer value can also be based on a signal strength indicator received from wireless device 302 with a response 504.

Processing node 306 initiates the first timer, and when it is determined that the first timer has expired, a message notification 508 is sent to wireless device 302 indicating that a message is available for wireless device 302. The message notification can notify wireless device 302 that a recorded voice mail, an email, a text message, a recording attached to a text message, or some other message is available. When message notification 508 is sent to wireless device 302, the second timer is initiated.

During the running of the second timer, it can be determined whether wireless device 302 responds 510 to message notification 508. Wireless device 302 can respond to message notification 508, for example, by listening to the recorded voice message, or requesting the delivery of an email, a text message, a recording attached to a message, or some other message. When wireless device 302 responds 510 to message notification 508 before the expiration of the second timer, a second notification message 512 is not sent.

When it is determined that the second timer expires before a response is received from wireless device 302, a second message notification 512 is sent to wireless device 302. Similar to message notification 508, second message notification 512 can notify wireless device 302 that a message is available for wireless device 302.

In an embodiment, when wireless device 302 receives second message notification 512, wireless device can send a request 514 to receive the available message. For example, request 514 can be sent to messaging node 308 via processing node 306. As another example, request 514 can be sent to processing node 306, and processing node 306 can send a second request to messaging node 308 based on request 514 from wireless device 302. When messaging node 308 receives request 514, messaging node 308 can provide the available message to wireless device 302, for example, in or together with message 516. It is noted that response 510, described above, can be a request to receive the available message, in which case processing node 306 can pass on the request to messaging node 308, or generate a request to messaging node 308 based on response 510 from wireless device 302. In such case, the messages sent among wireless device 302, processing node 306, and messaging node 308 are similar to the messages 514 and 516, described above.

Figure 6:
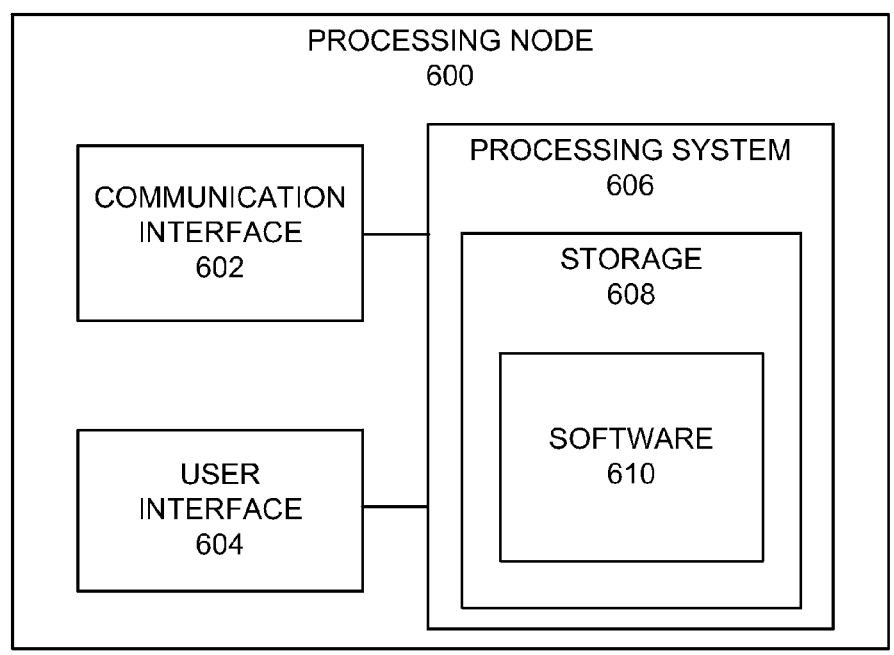
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of providing a message notification to a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 608 from storage 610. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include processing node 104, processing node 306, and messaging node 308. Processing node 600 can also be a network element in communication network 106 or communication network 310, or processing node can be an adjunct or component of a network element, such as an element of communication network 106 or communication network 310.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing a message notification in a wireless communication system, comprising: sending at least one paging message to a wireless device and determining whether a response is received from the wireless device to any of the at least one paging message; initiating a timer comprising a timer value based on a number of the at least one paging message sent to the wireless device, and whether a response is received from the wireless device to any of the at least one paging message; sending a message notification when the timer expires to the wireless device indicating that the message is available for the wireless device; receiving a response from the wireless device to the at least one paging message, the response comprising a signal strength indicator; and initiating the timer comprising a timer value based on the number of the at least one paging message sent to the wireless device, whether the wireless device responded to any of the at least one paging message, and the signal strength indicator.

2. The method of claim 1, further comprising receiving at a processing node a message notifier indicating that a message is available for the wireless device.

3. The method of claim 1, further comprising:
initiating a second timer comprising a second timer value based on the number of the at least one paging message sent to the wireless device, and whether the wireless device responded to any of the at least one paging message; and
sending a second message notification when the second timer expires before a response is received from the wireless device to the message notification.

4. The method of claim 3, wherein the second timer starts when the timer expires.

5. A method of providing a message notification in a wireless communication system, comprising: sending at least one paging message to a wireless device and determining whether a response is received from the wireless device to any of the at least one paging message; and initiating a timer comprising a timer value based on a number of the at least one paging message sent to the wireless device, and whether the wireless device responded to any of the at least one paging message, wherein the timer value further comprises a first setting when a first criteria indicates that the wireless device did not receive any of the at least one paging message, and a second setting when a second criteria indicates that the wireless device responded to the at least one paging message with a refusal indication; receiving a response from the wireless device to the at least one paging message, the response comprising a signal strength indicator; and initiating the timer comprising a timer value based on the number of the at least one paging message sent to the wireless device, whether the wireless device responded to any of the at least one paging message, and the signal strength indicator.

6. The method of claim 5, wherein the timer value further comprises a third setting when a third criteria indicates that the wireless device responded to only one of a plurality of paging messages.

7. The method of claim 5, further comprising sending a message notification when the timer expires to the wireless device indicating that the message is available for the wireless device.

8. The method of claim 5, further comprising:
initiating a second timer comprising a second timer value based on the number of the at least one paging message sent to the wireless device, and whether the wireless device responded to any of the paging message, wherein the timer value further comprises
a fourth setting when a fourth criteria indicates that the wireless device did not receive any of the at least one paging message,
a fifth setting when a fifth criteria indicates that the wireless device responded to the at least one paging message with a refusal indication, and
a sixth setting when a sixth criteria indicates that the wireless device responded to only one of a plurality of paging messages.

9. The method of claim 6, wherein the second timer starts when the timer expires.

10. The method of claim 5, further comprising sending a second message notification when the second timer expires before a response is received from the wireless device to the message notification.

11. A system for providing a message notification in a wireless communication system, comprising: a processing node configured to send at least one paging message to a wireless device and determine whether a response is received from the wireless device to any of the at least one paging message; initiate a timer comprising a timer value based on a number of the at least one paging message sent to the wireless device, and whether a response is received from the wireless device to any of the at least one paging message; send a message notification when the timer expires to the wireless device indicating that the message is available for the wireless device; receive a response from the wireless device to the at least one paging message, the response comprising a signal strength indicator; and initiate the timer comprising a timer value based on the number of the at least one paging message sent to the wireless device, whether the wireless device responded to any of the at least one paging message, and the signal strength indicator.

12. The system of claim 11, wherein the processing node is further configured to receive a message notifier indicating that a message is available for the wireless device.

13. The system of claim 11, wherein the processing node is further configured to:
   initiate a second timer comprising a second timer value based on the number of the at least one paging message sent to the wireless device, and whether the wireless device responded to any of the at least one paging message; and
   send a second message notification when the second timer expires before a response is received from the wireless device to the message notification.

14. The system of claim 13, wherein the second timer starts when the timer expires.

15. The system of claim 11, wherein the timer value further comprises:
   a first setting when a first criteria indicates that the wireless device did not receive any of the at least one paging message, and
   a second setting when a second criteria indicates that the wireless device responded to the at least one paging message with a refusal indication.

16. The system of claim 15, wherein the timer value further comprises a third setting when a third criteria indicates that the wireless device responded to only one of a plurality of paging messages.

17. The system of claim 16, further comprising:
   initiating a second timer comprising a second timer value based on the number of the at least one paging message sent to the wireless device, and whether the wireless device responded to any of the paging message, wherein the timer value further comprises
   a fourth setting when a fourth criteria indicates that the wireless device did not receive any of the at least one paging message,
   a fifth setting when a fifth criteria indicates that the wireless device responded to the at least one paging message with a refusal indication, and
   a sixth setting when a sixth criteria indicates that the wireless device responded to only one of a plurality of paging messages.

* * * * *